(12) United States Patent
Lemoff et al.

(10) Patent No.: US 6,744,953 B2
(45) Date of Patent: Jun. 1, 2004

(54) PLANAR OPTICAL WAVEGUIDE WITH ALIGNMENT STRUCTURE

(75) Inventors: Brian Elliot Lemoff, Union City, CA (US); William Gong, Sunnyvale, CA (US); Richatd P. Tella, Sunnyvale, CA (US); Tirumala R. Ranganath, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 115 days.

(21) Appl. No.: 09/949,395

(22) Filed: Sep. 7, 2001

(65) Prior Publication Data

US 2003/0048994 A1 Mar. 13, 2003

(51) Int. Cl.[7] .............................. G02B 6/26; G02B 6/10
(52) U.S. Cl. ........................................ 385/52; 385/129
(58) Field of Search .................................... 385/52, 129

(56) References Cited

U.S. PATENT DOCUMENTS

| | | | | |
|---|---|---|---|---|
| 5,218,663 A | * | 6/1993 | Isono et al. ................. | 385/129 |
| 5,297,228 A | * | 3/1994 | Yanagawa et al. .......... | 385/129 |
| 5,790,737 A | | 8/1998 | Aoyagi et al. .............. | 385/131 |
| 6,227,722 B1 | * | 5/2001 | Kropp ......................... | 385/88 |
| 2001/0009597 A1 | * | 7/2001 | Alibert ........................ | 385/52 |
| 2002/0028046 A1 | * | 3/2002 | Delprat ....................... | 385/52 |
| 2003/0026577 A1 | * | 2/2003 | Gao et al. ................... | 385/131 |

FOREIGN PATENT DOCUMENTS

| | | |
|---|---|---|
| EP | 0 798 576 | 10/1997 |
| EP | 1 122 561 | 8/2001 |
| JP | 06118256 | 4/1994 |
| WO | WO 01/29601 | 4/2001 |

* cited by examiner

*Primary Examiner*—Michael C. Zarroli (57) ABSTRACT

Planar optical waveguide apparatus and methods for fabricating planar optical waveguide apparatus. The apparatus has a core layer and a cladding layer, the core layer having at least one optical waveguide, and an alignment structure spaced from and positioned with respect to the at least one optical waveguide to facilitate measuring a position of the at least one optical waveguide. The alignment structure has a first alignment structure, such as a reflecting member, to facilitate measuring a height of the at least one optical waveguide; and a second alignment structure, such as alignment marks, to facilitate measuring positions of the at least one optical waveguide in a plane of the at least one optical waveguide. The method includes forming both the optical waveguide and at least a portion of the alignment structure simultaneously in a single processing step to ensure that the optical waveguide and the alignment structure are in perfect registration.

7 Claims, 6 Drawing Sheets

PLANAR OPTICAL WAVEGUIDE WITH ALIGNMENT STRUCTURE

BACKGROUND OF THE INVENTION

1. Technical Field of the Invention

The present invention relates generally to the field of planar optical waveguides. More particularly, the invention relates to planar optical waveguide apparatus that include an alignment structure to facilitate measuring the position of an optical waveguide of the apparatus; and to methods for fabricating planar optical waveguide apparatus.

2. Description of Related Art

Planar optical waveguides include a core, comprising one or more channels of transparent material, typically glass, embedded in a cladding of another optical material, typically also glass, that has a refractive index lower than that of the core material. The difference in refractive index between the core and the cladding allows light to be guided in the core.

In many applications that utilize a planar optical waveguide apparatus, it is necessary to connect an external component, such as a laser, a detector, optical fibers, or the like, to the apparatus in such a manner that the component is correctly aligned with the input or output edge of an optical waveguide in the apparatus so as to properly couple light into or out of the waveguide.

A variety of techniques have been developed and are utilized in the prior art to achieve this alignment. For example, one frequently used procedure is an active alignment procedure wherein the component being aligned is moved relative to the planar optical waveguide apparatus while the coupled power between the component and an optical waveguide in the apparatus is monitored. Alignment is optimized when the coupled power is at a maximum value; and, at that time, the component and the planar optical waveguide apparatus are connected together.

While an active alignment procedure can be effective in many applications, it is not always practical, or even possible, to connect the component to the planar optical waveguide apparatus while light is going through the system. For example, if the component being aligned is a laser, and if the planar optical waveguide apparatus will be subjected to a high temperature during soldering of the component to the apparatus; the laser cannot be turned on during the soldering process.

Another common alignment procedure involves measuring the position of the input or output edge of the optical waveguide relative to the position of the component that is to be aligned with the optical waveguide, and then setting and fixing the position of the planar optical waveguide apparatus to the desired values. This procedure, however, requires that the position of the input or output edge of the optical waveguide be precisely measured in x, y and z directions; and these measurements are normally rather difficult to achieve.

Figure 1:
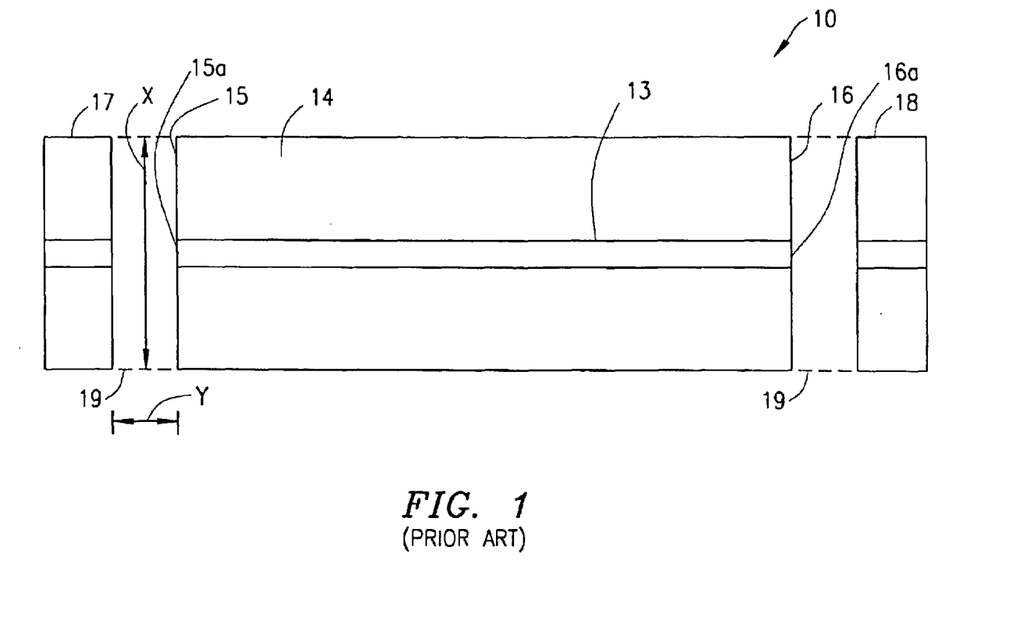
FIG. 1 is a top plan view of a planar optical waveguide apparatus that is known in the prior art.
Figure 2:
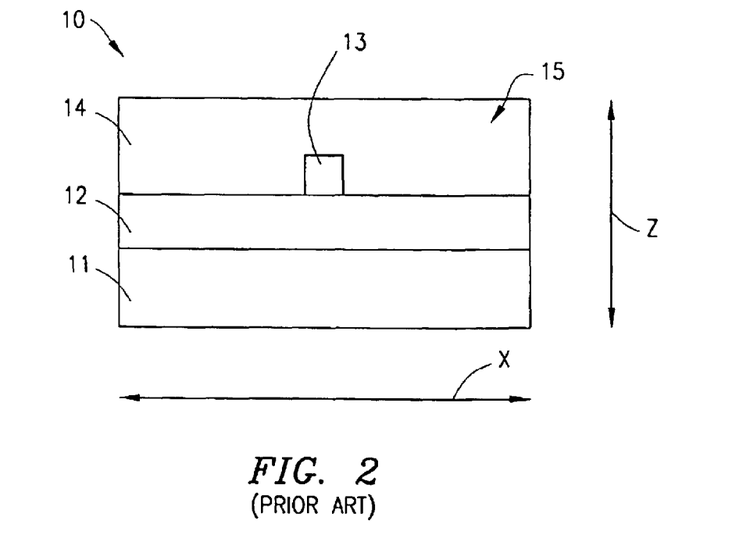
FIG. 2 is an end plan view of the planar optical waveguide apparatus of FIG. 1.

In particular, FIG. 1 is a top plan view and FIG. 2 is an end plan view schematically illustrating a planar optical waveguide apparatus that is known in the prior art. The apparatus is generally designated by reference number 10 and comprises a substrate 11, a lower cladding layer 12, a core layer 13 and an upper cladding layer 14. The core layer is formed from a suitable transparent optical material, usually glass; and the cladding layers are formed of another optical material, also usually glass, having a lower refractive index than that of the core layer material. The substrate often comprises silicon.

The difference in refractive index between the material of the core layer and the cladding layers permits light to be transmitted through the core layer; and by forming the core layer 13 into a waveguide, as illustrated in FIGS. 1 and 2, it is possible to guide light through the apparatus.

With reference to FIG. 1, optical waveguide 13 extends through apparatus 10 from input end 15 thereof to output end 16 such that light entering the waveguide 13 at input end 15 is guided through the apparatus and exits the waveguide at output end 16. The light may be input into the waveguide 13 from a first external component, generally designated by reference number 17; and may be output from the waveguide 13 to a second external component, generally designated by reference number 18. The external components 17 and 18 may be connected to the apparatus 10 as schematically illustrated at 19 in FIG. 1.

In order for the planar optical waveguide apparatus 10 to properly transmit light from component 17 to component 18, input and output edges 15a and 16a of the optical waveguide 13 must be precisely aligned relative to the components 17 and 18, respectively; and to achieve proper alignment, it is necessary that the positions of the edges 15a and 16a of the waveguide 13 be accurately known in x, y and z directions.

The x-position of the optical waveguide is the position of the optical waveguide in the x-direction illustrated by arrow x in FIGS. 1 and 2; i.e., the lateral position of the optical waveguide. The y-position of the optical waveguide is the position of the waveguide in the y-direction illustrated by the arrow y in FIG. 1; i.e., the direction perpendicular to the input or output edge of the optical waveguide and that defines the spacing between the input or output edge of the optical waveguide and the component being aligned therewith. The z-position of the optical waveguide is the position of the waveguide in the z-direction illustrated by the arrow z in FIG. 2; i.e, the height of the optical waveguide.

By knowing the position of the external component 17 or 18, and by knowing the x, y and z positions of the optical waveguide, the planar optical waveguide apparatus and the component can be properly positioned relative to one another.

The position of the external component 17 or 18 is determined utilizing suitable indicia provided on the component. The x and y and z positions of the edges of the optical waveguide are determined by detecting and measuring the positions of features of the optical waveguide itself. Specifically, to measure the x and y positions of the edges of the optical waveguide, an image of the optical waveguide is made in a plane of the waveguide apparatus. Inasmuch, however, as the difference between the refractive index of the core material forming the waveguide and the refractive index of the cladding material is normally quite small; attempts to image the waveguide result in a low contrast image, making precise measurements difficult. The z position of the edges of the optical waveguide are usually measured using light reflected from either the upper or lower surface of the waveguide. Again, since the index difference between the core and cladding materials is quite small; very little light will be reflected from the surface, making it difficult to accurately measure the z position of the edges of the waveguide.

What is needed is a method and apparatus that facilitates accurate measurement of the x, y and z positions of the input or output edge of the optical waveguide in a planar optical waveguide apparatus.

SUMMARY OF THE INVENTION

The present invention provides a planar optical waveguide apparatus that includes alignment structure to facilitate measuring the position of an optical waveguide of the apparatus.

A planar optical waveguide apparatus of the present invention comprises a core layer and a cladding layer, the core layer including at least one optical waveguide. In addition, the apparatus includes an alignment structure that is spaced from and positioned with respect to the at least one optical waveguide to facilitate measuring a position of the at least one optical waveguide.

A planar optical waveguide apparatus according to the present invention addresses the difficulty in the prior art of accurately measuring the position of an optical waveguide in the apparatus. According to an embodiment of the invention, the position of an optical waveguide in a planar optical waveguide apparatus can be accurately measured by providing alignment structure in the apparatus that is spaced from and precisely positioned with respect to the waveguide. The present invention permits the position of an optical waveguide to be measured more easily and with greater accuracy to, in turn, permit an input edge and/or an output edge of the optical waveguide to be more accurately aligned relative to an external component.

According to one embodiment of the invention, the alignment structure includes a first alignment structure to facilitate measuring a z position of an optical waveguide of the apparatus; and a second alignment structure to facilitate measuring x and y positions of the optical waveguide in a plane of the apparatus. The first alignment structure preferably comprises a reflecting member positioned with respect to the upper or lower surface of the optical waveguide, and capable of reflecting sufficient light to permit the z position of the waveguide to be accurately measured. The second alignment structure preferably comprises alignment marks in registration with the optical waveguide and capable of providing a high contrast image to permit the x and y positions of the waveguide to be accurately measured. Because the alignment structure is spaced from the at least one optical waveguide, the structure will not, in any way, interfere with the light transmission characteristics of the waveguide.

The reflecting member may comprise a thin layer of a reflective material, such as a layer of metallic material. Alternatively, the reflecting member may comprise a thin layer of a material, such as silicon, having a high index of refraction relative to the indices of refraction of the core layer material and the cladding layer material so as to define a surface from which sufficient light will be reflected. The alignment marks may include patterns formed in the reflecting layer so as to be easily visible in an image of the optical waveguide.

According to further embodiments of the invention, methods are provided for fabricating a planar optical waveguide apparatus having an alignment structure therein. In general, the methods may include simultaneously forming an optical waveguide of the apparatus and at least a portion of the alignment structure during a single processing step to ensure accurate registration therebetween. Preferably, the single processing step comprises simultaneously forming the optical waveguide and at least a portion of the alignment structure in a single etch process step.

Furthermore, the invention provides embodiments with other features and advantages in addition to or in lieu of those discussed above. Many of these features and advantages are apparent from the description below with reference to the following drawings.

DETAILED DESCRIPTION OF EXEMPLARY EMBODIMENTS OF THE INVENTION

Figure 3:
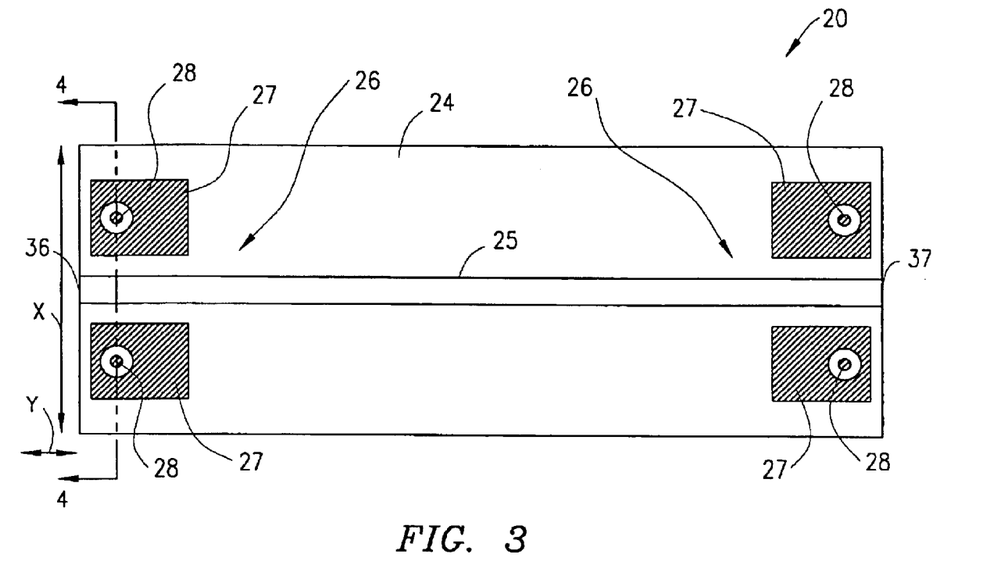
FIG. 3 is a top plan view schematically illustrating a planar optical waveguide apparatus according to a first embodiment of the present invention.
Figure 4:
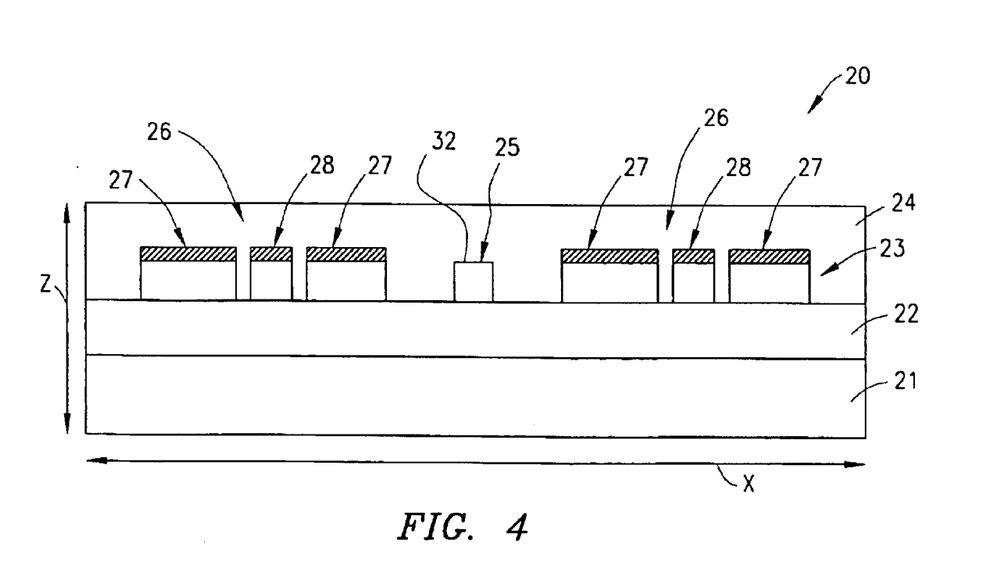
FIG. 4 is a cross-sectional view of the optical waveguide apparatus of FIG. 3 taken along the line 4—4 in FIG. 3 and enlarged somewhat to illustrate details of the apparatus.

FIGS. 3 and 4 illustrate a planar optical waveguide apparatus according to a first embodiment of the present invention. The apparatus is generally designated by reference number 20, and comprises a substrate 21, a lower cladding layer 22, a core layer 23, and an upper cladding layer 24. As is known to those skilled in the art, the core layer 23 is formed from a suitable transparent optical material, usually glass; and the cladding layers are formed of another optical material, also usually glass, having a lower refractive index than that of the core layer material. The substrate typically comprises silicon.

The difference in refractive index between the material of the core layer and the material of the cladding layers permits light to be transmitted through the core layer; and by forming the core layer into one or more optical waveguides, it becomes possible to accurately guide light through the apparatus.

In the apparatus illustrated in FIGS. 3 and 4, the core layer 23 includes an optical waveguide portion 25 that is capable of transmitting light through the apparatus; and an alignment structure, generally designated by reference number 26, to facilitate accurate measurement of the position of the waveguide 25. As described above, by accurately measuring the position of the optical waveguide, a more accurate alignment of an external component, such as a laser, a detector, optical fibers, or the like (not shown in FIGS. 3 and 4), to an input edge 36 or an output edge 37 of the optical waveguide 25 can be achieved so as to more efficiently couple light into or out of the waveguide.

More particularly, as also mentioned above, a common procedure for aligning an external component to the optical waveguide is to position the component to be aligned and the input or output edge of the optical waveguide relative to one another along x, y and z directions; and then set and fix the relative positions to the desired values. To do this correctly, however, it is necessary that the x, y, and z positions of the input or output edge of the waveguide be precisely measured. The external component is typically provided with suitable indicia to enable the position of the component to be accurately measured; however, accurate measurement of the x, y and z positions of the edges of the optical waveguide are normally rather difficult to achieve because the difference between the refractive index of the core material and the refractive index of the cladding material is quite small.

According to the first embodiment of the present invention, however, accurate measurements of the x, y and z positions of the optical waveguide 25 are facilitated by providing alignment structure 26 in the planar optical waveguide apparatus. Preferably, as illustrated in FIG. 3, the alignment structure 26 is provided adjacent both the input and output ends of the planar optical waveguide apparatus to permit the positions of the input and output edges 36 and 37 to be accurately measured.

In particular, as illustrated in FIGS. 3 and 4, alignment structure 26 includes first alignment structure 27 to facilitate measuring the z position of the optical waveguide 25 (i.e., the position of the optical waveguide in the z-direction as illustrated by arrow z in FIG. 4); and second alignment structure 28 to facilitate measuring the x and y positions of the waveguide (i.e., the positions of the waveguide in the directions illustrated by arrow x in FIGS. 3 and 4 and arrow y in FIG. 3).

Alignment structure 26 comprises a reflecting member 27 positioned to be aligned with the upper surface 32 of the optical waveguide 25, and capable of reflecting a sufficient amount of light to permit the z position of the waveguide to be accurately measured. Specifically, the reflecting member 27 will typically reflect more light than the surfaces defined by the interfaces between the optical waveguide 25 and the cladding layers 22 and 24. This permits accurate measurements to be more easily obtained.

The reflecting member 27 can comprise a thin layer of a reflective material, such as a layer of a suitable metallic material: or it can comprise a thin layer of a material, such as silicon, having a higher refractive index than the refractive indices of the core layer material and the cladding layer material.

The reflecting member 27 is located within the planar optical waveguide apparatus at positions spaced from the optical waveguide 25 so that it will not interfere with the transmission characteristics of the waveguide, but is precisely aligned with or otherwise positioned with respect to the upper surface 32 of the waveguide so that accurate measurements can be made.

The alignment structure 26 comprises a pair of alignment marks 28 positioned above the core layer and aligned with the optical waveguide 25 so as to facilitate measuring the x and y positions of the waveguide. Specifically, the alignment marks 28 are formed of a material that will provide a high contrast image to permit the x and y positions of the waveguide to be accurately measured. Preferably, and as shown in FIG. 4, alignment marks 28 are patterned in the reflecting layer 27 so as to be above the core layer. Most preferably, and as will be described more fully hereinafter, at least a portion of the alignment structure 26 is formed simultaneously with the forming of the optical waveguide 25 in a single processing step to ensure that the marks will be in perfect registration with the waveguide.

Figure 5:
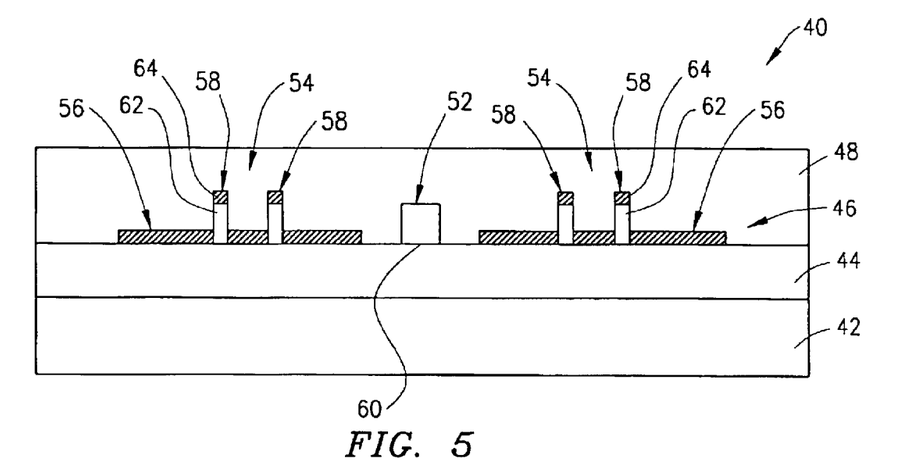
FIG. 5 is a cross-sectional view schematically illustrating a planar optical waveguide apparatus according to a second embodiment of the present invention.

FIG. 5 illustrates a planar optical waveguide apparatus 40 according to a second embodiment of the present invention. As in the embodiment of FIGS. 3 and 4, planar optical waveguide apparatus 40 includes a substrate 42, a lower cladding layer 44, a core layer 46 and an upper cladding layer 48. Also, as in the embodiment of FIGS. 3 and 4, the core layer 46 includes a waveguide portion 52 and an alignment structure 54 comprised of a first alignment structure 56 and a second alignment structure 58. In the embodiment of FIG. 5, however, the first alignment structure 56 comprises a reflecting member located on the upper surface of the lower cladding layer 44 and positioned to be aligned with the lower surface 60 of the optical waveguide 52 to facilitate measuring the z position of the waveguide. The alignment marks comprising the second alignment structure 58 continue to be located just above the core layer and are precisely positioned with respect to the optical waveguide 52 to facilitate measuring of the x and y positions of the waveguide. As shown in FIG. 5, the alignment marks 58 comprise ridges 62 in the core layer having a reflecting layer 64 applied to the top surfaces thereof so as to provide a high contrast image for measuring the x and y positions of the waveguide. The ridges 62 are preferably formed simultaneously with the optical waveguide 52 in a single processing step so as to guarantee proper registration therebetween. As shown in FIG. 5, the alignment structure 54 is spaced from the waveguide 52 to ensure it will not interfere with the light transmission characteristics of the waveguide.

Figure 6:
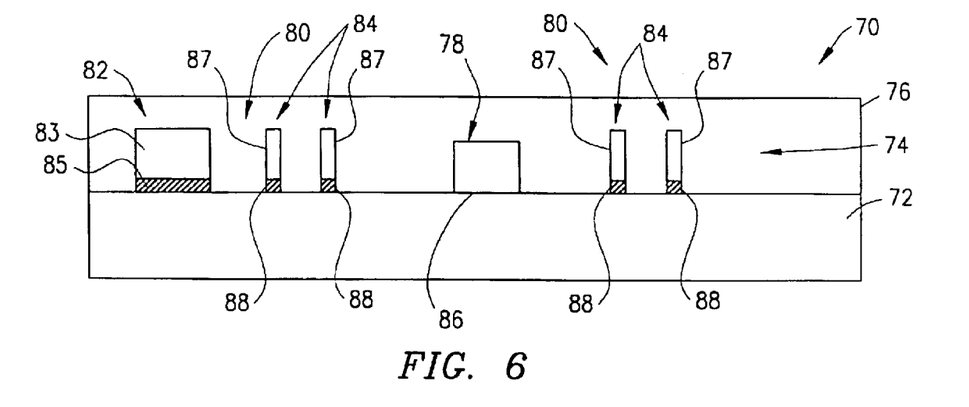
FIG. 6 is a cross-sectional view schematically illustrating a planar optical waveguide apparatus according to a third embodiment of the present invention.

FIG. 6 illustrates a planar optical waveguide apparatus 70 according to a third embodiment of the present invention. Apparatus 70 generally comprises a substrate 72, a core layer 74 and an upper cladding layer 76.

In the embodiment of FIG. 6, the substrate 72 comprises silica and functions as the lower cladding layer of the apparatus. The core layer 74 includes an optical waveguide portion 78 and an alignment structure, generally designated by reference number 80. The alignment structure 80 includes a first alignment structure 82 and a second alignment structure 84. The first alignment structure 82 comprises a reflecting member 85, comprised of a thin layer of silicon, at the lower end of a ridge 83 and aligned with respect to the lower surface 86 of the optical waveguide 78 to facilitate measuring the z position of the waveguide. The second alignment structure 84 includes a plurality of alignment marks in the form of ridges 87 aligned with the waveguide 78 and having thin layers 88 of silicon at their lower ends to facilitate measuring the x and y positions of the waveguide. The ridges 83 and 87 are formed of the same material as the optical waveguide 78 and are preferably formed simultaneously with the optical waveguide in a single processing step so as to guarantee proper registration therebetween.

In the embodiment of FIG. 6, the thin silicon layer 85 functions as the first alignment structure for facilitating measuring of the z position of the waveguide; and, the thin silicon layers 88, because they are located at the lower ends of the ridges 87 of the second alignment structure, enhance the visibility of the ridges to facilitate measuring the x and y positions of the waveguide.

The planar optical waveguide apparatus illustrated in FIG. 6 facilitates attachment of a laser to the apparatus, and is particularly suitable when coupling an array of lasers to array waveguide multiplexer devices.

Figure 7A:
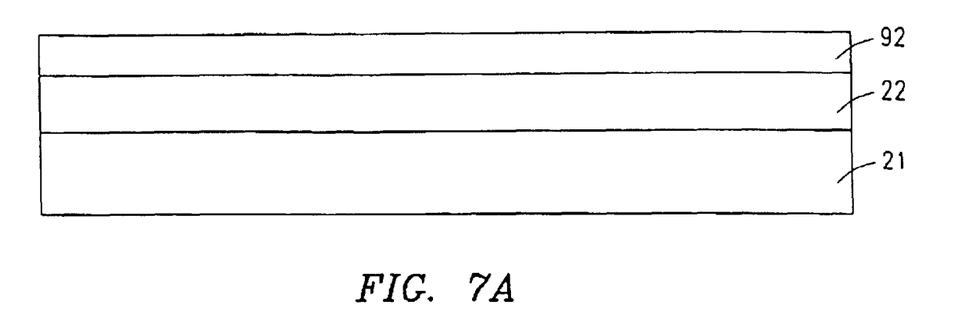
FIGS. 7A–7C illustrate a method for fabricating a planar optical waveguide apparatus, such as the apparatus illustrated in FIGS. 3 and 4, according to a fourth embodiment of the present invention.
Figure 7B:
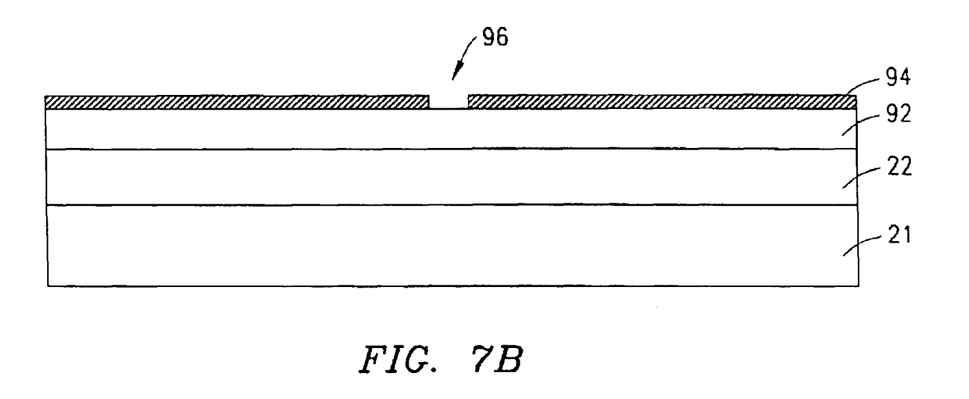
Figure 7C:
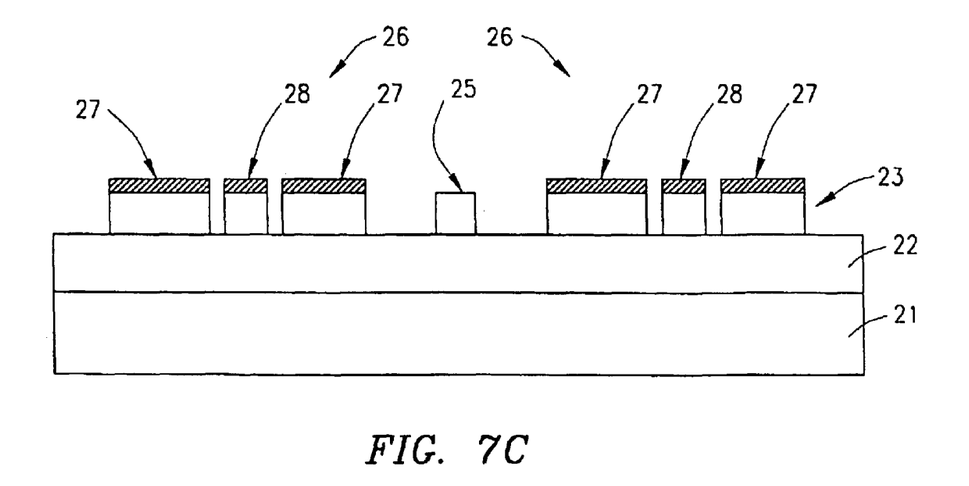

FIGS. 7A–7C illustrate a method for fabricating a planar optical waveguide apparatus, such as the apparatus 10 illustrated in FIGS. 3 and 4, according to a further embodiment of the present invention. Initially, as shown in FIG. 7A, a planar core layer 92 is provided atop a lower cladding layer 22 that, in turn, is supported on a substrate 21. Next, a reflecting layer 94 is deposited on top of the core layer; and is patterned to remove the reflecting layer from the area 96 at which the optical waveguide 25 will be formed as shown in FIG. 7B.

Next, in a single patterning step, both the alignment structure 26 and the waveguide 25 are formed as shown in FIG. 7C. In an embodiment of the invention, the patterning step comprises an etch process. The alignment structure is formed by etching through the reflective layer and the core layer, while the waveguide is formed by etching through the core layer. By forming the waveguide and the alignment structure simultaneously in the same etch process step, perfect registration between the components is guaranteed. Finally, the upper cladding layer 24 (not shown) is deposited to provide the planar optical waveguide apparatus 10 shown in FIGS. 3 and 4.

Figure 8A:
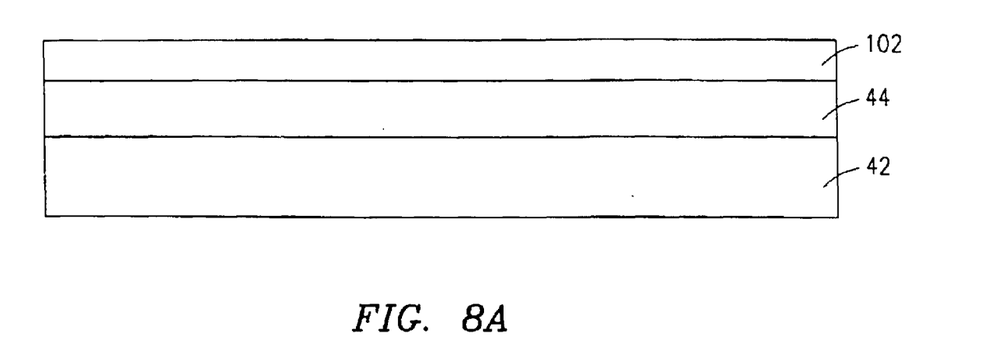
FIGS. 8A–8C illustrate a method for fabricating a planar optical waveguide apparatus, such as the apparatus illustrated in FIG. 5, according to a fifth embodiment of the present invention.
Figure 8B:
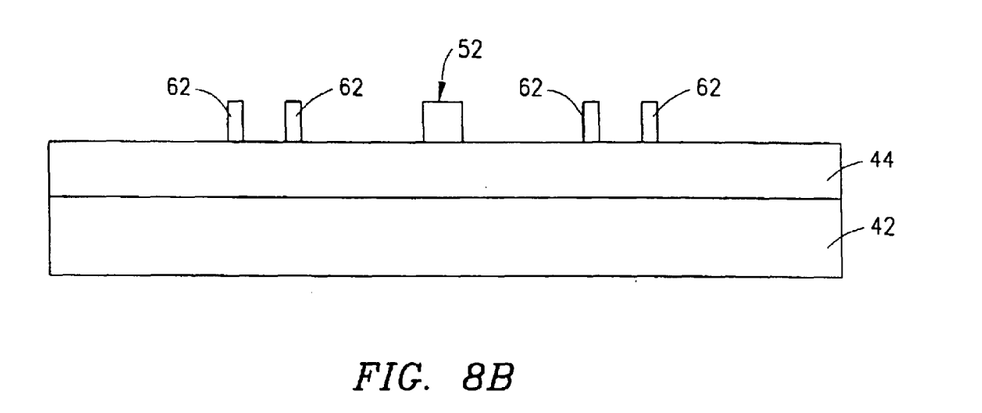
Figure 8C:
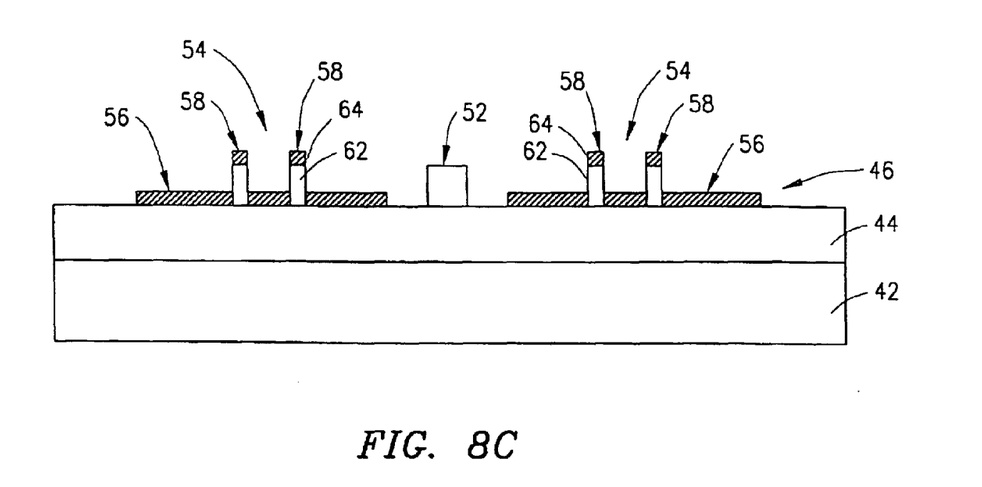

FIGS. 8A–8C illustrate a method for fabricating a planar optical waveguide apparatus, such as the apparatus 40 illustrated in FIG. 5, according to yet a further embodiment of the present invention. Initially, as in the embodiment illustrated in FIGS. 7A–7C, a core layer 102 is provided atop a lower cladding layer 44 that is supported on a substrate 42 as shown in FIG. 7A. Next, in a single patterning step, preferably an etch process step, the waveguide 52 and the ridges 62 of the alignment marks 58 are formed in the core layer as shown in FIG. 7B. At this time, both the waveguide and the alignment marks appear as ridges of the core material.

Next, a reflective film is deposited and patterned so that the film covers a portion of the exposed upper surface of the lower cladding layer 44, as shown at 56; and the ridges 62 of the alignment marks 58, as shown at 64, but not the waveguide 52 as illustrated in FIG. 8C. Finally, the upper cladding layer 48 (not shown) is deposited to provide the finished planar optical waveguide apparatus 40 illustrated in FIG. 5.

Figure 9A:
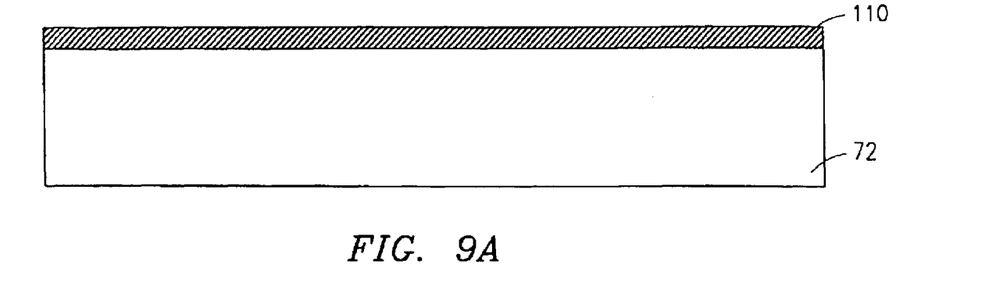
FIGS. 9A–9D illustrate a method for fabricating a planar optical waveguide apparatus, such as the apparatus illustrated in FIG. 6, according to a sixth embodiment of the present invention.
Figure 9B:
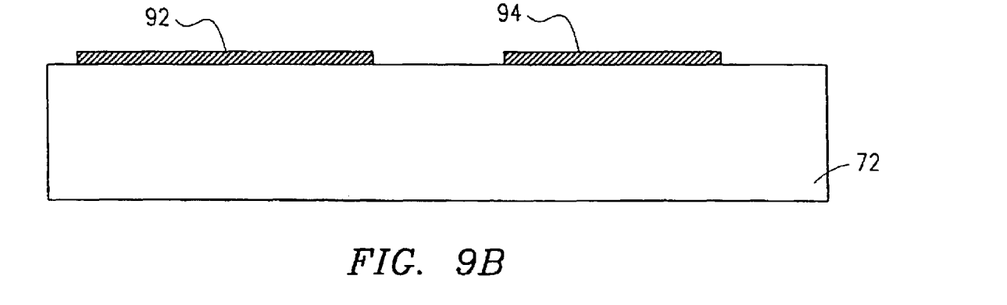
Figure 9C:
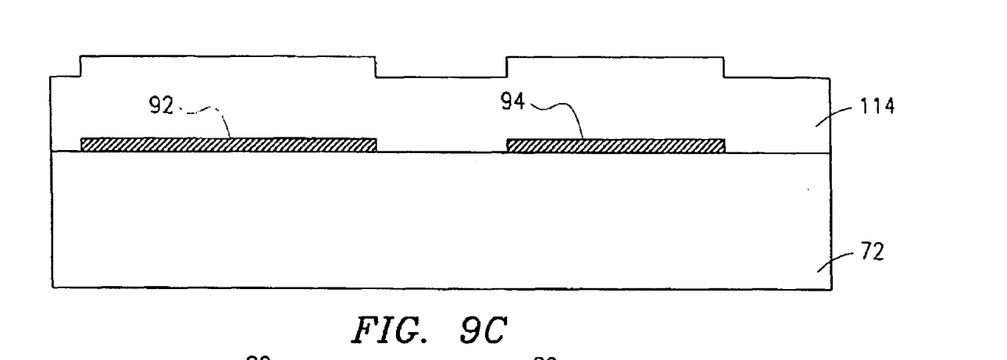
Figure 9D:
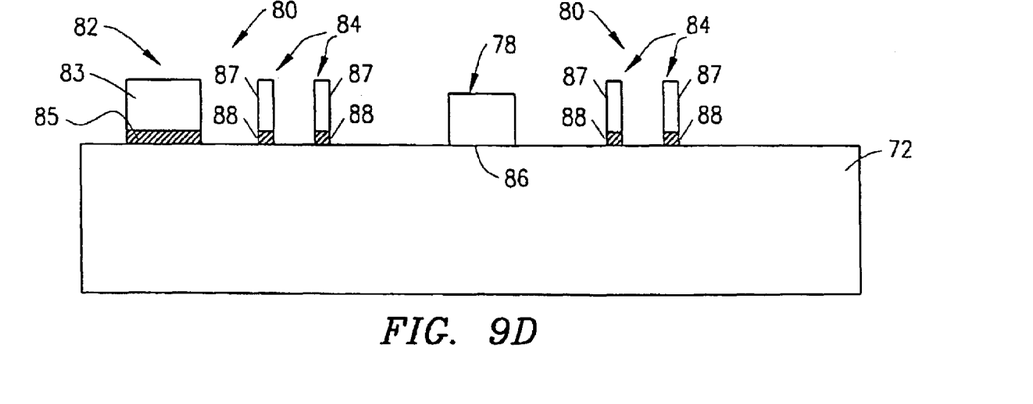

FIGS. 9A–9D illustrate a method for fabricating a planar optical waveguide apparatus such as the apparatus 70 illustrated in FIG. 6. Initially, as shown in FIG. 9A, a thin layer 110 of silicon is deposited on a silica substrate 72. The silicon layer 110 is then patterned to clear a space for the waveguide 78. The areas 92 and 94 remain as shown in FIG. 9B. A layer of material 114, shown in FIG. 9C, is deposited on the structure of FIG. 9B as the core layer 74. Then, the waveguide 78 and the alignment structure 80 are patterned in the core layer in a single etching step. Specifically, the same etching step that etches away the core layer to form the waveguide 78, also etches through the core layer and the silicon areas 92 and 94 to form the alignment structure 80. This ensures that the alignment structure will be properly aligned to the waveguide. As a result of this etching step, the waveguide 78 and alignment structure are formed as shown in FIG. 9D. The upper cladding layer 76 (not shown) is then deposited to provide the waveguide apparatus illustrated in FIG. 6.

It should be clearly understood that a planar optical waveguide apparatus of the present invention, such as the embodiments illustrated in FIGS. 3–6 can be fabricated by methods other than those described above. It should also be understood that the specific embodiments described herein can be varied in many ways without departing from the scope of the present invention. For example, although the planar optical waveguide apparatus 10, 40 and 70 described above contain only one optical waveguide, such apparatus may incorporate a plurality of waveguides; and an alignment structure of the present invention can also be used to align waveguides in an apparatus containing a plurality of waveguides. Also, the reflecting members and the alignment marks could be configured and positioned in different ways as long as they are appropriately positioned with respect to the waveguides.

While what has been described constitutes exemplary embodiments of the invention, it should be recognized that the invention can be varied in numerous ways without departing from the scope thereof. Accordingly, it should be recognized that the invention should be limited only insofar as is required by the scope of the following claims.

What is claimed is:

1. A method for fabricating a planer optical waveguide apparatus, said apparatus including at least one optical waveguide positioned between upper and lower cladding layers and an alignment structure spaced from said at least one optical waveguide to facilitate measuring a position of said at least one optical waveguide, said method comprising:

providing a core layer on said lower cladding layer;

simultaneously forming said at least one optical waveguide and at least a portion of said alignment structure during a single processing step to ensure accurate alignment between said at least one optical waveguide and said at least a portion of said alignment structure; and applying a layer of reflecting material to said lower cladding layer and on said at least a portion of said alignment structure.

2. A method for fabricating a planar optical waveguide apparatus, said apparatus including at least one optical waveguide positioned between upper and lower cladding layers and an alignment structure spaced from said at least one optical waveguide to facilitate positioning said at least one optical waveguide, said method comprising:

applying a layer of reflecting material to said lower cladding layer;

providing a core layer on said lower cladding layer; and simultaneously forming said at least one optical waveguide and at least a portion of said alignment structure during a single processing step to ensure accurate registration between said at least one optical waveguide and said at least a portion of said alignment structure.

3. The method according to claim 1, wherein said applying comprises applying a layer of reflecting material to said lower cladding layer in alignment with a lower surface of said at least one optical waveguide to facilitate measuring a height of said at least one optical waveguide.

4. The method according to claim 1, wherein said applying comprises applying a layer of reflecting material to an upper surface of said at least a portion of said alignment structure to facilitate measuring positions of said at least one optical waveguide in a plane of said at least one optical waveguide.

5. The method according to claim 1, and further comprising depositing said upper cladding layer to position said at least one optical waveguide between said upper and lower cladding layers.

6. The method according to claim 2, and further comprising patterning said layer of reflecting material to expose a portion of said lower cladding layer prior to providing said core layer.

7. The method according to claim 2, and further comprising depositing said upper cladding layer to position said at least one optical waveguide between said upper and lower cladding layers.

* * * * *